United States Patent

[11] 3,603,988

| [72] | Inventor | George L. Johnson |
| | | Nashua, N.H. |
| [21] | Appl. No. | 1,006 |
| [22] | Filed | Jan. 6, 1970 |
| [45] | Patented | Sept. 7, 1971 |
| [73] | Assignee | Sanders Associates, Inc. |
| | | Nashua, N.H. |

[54] PULSE DENSITY DEMODULATOR
10 Claims, 6 Drawing Figs.
[52] U.S. Cl.................................................. 343/5 R
[51] Int. Cl.................................................. G01s 9/02
[50] Field of Search.................................... 343/5, 5 DP, 17.1

[56] References Cited
UNITED STATES PATENTS

| 3,047,806 | 7/1962 | Heslop............... | 343/5 DP |
| 3,267,466 | 8/1966 | Poterack et al...... | 343/17.1 X |
| 3,497,815 | 2/1970 | Turner............... | 343/5 X |
| 3,555,547 | 1/1971 | Arvidsson........... | 343/5 DP |

Primary Examiner—Malcolm F. Hubler
Attorney—Louis Etlinger

ABSTRACT: Pulse bursts are separated from background pulse trains by first standardizing the heights and widths of all incoming pulses. The standard pulses are passed to an averaging circuit, where the background pulses provide a DC or low frequency component in the output, whereas the arrival of a pulse burst causes a relatively rapid change in the output. These changes are detected from the background by means of a high pass filter.

PATENTED SEP 7 1971 3,603,988
INVENTOR
GEORGE L. JOHNSON
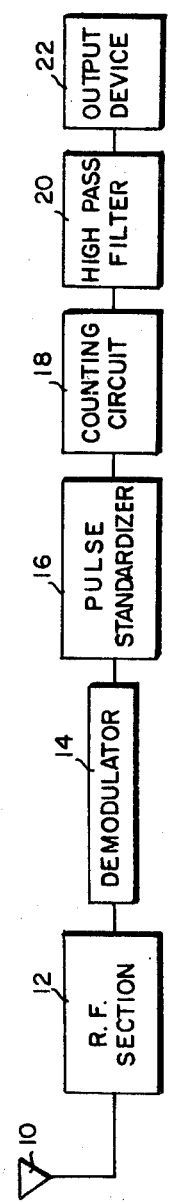
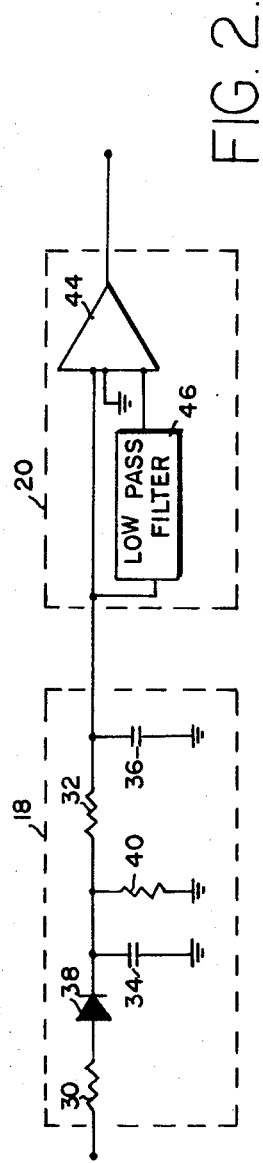
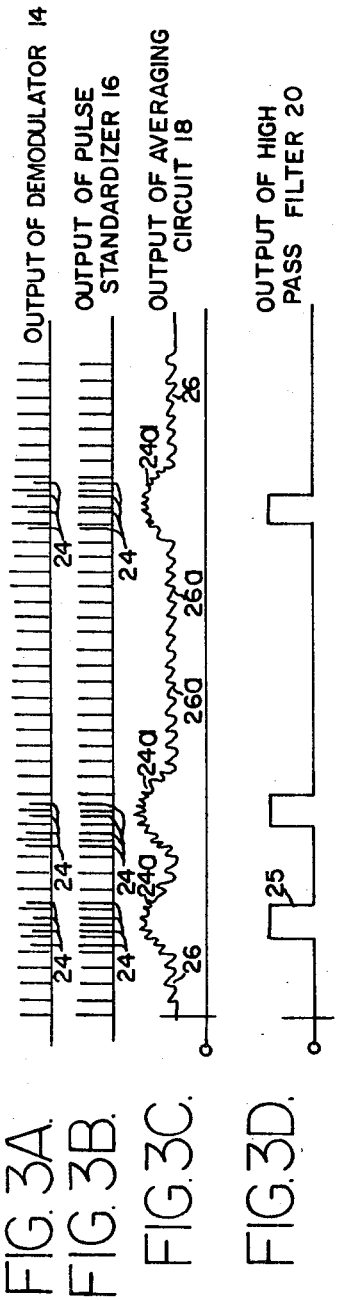
BY Richard S. Seligman
ATTORNEY

PULSE DENSITY DEMODULATOR

BACKGROUND OF THE INVENTION

1. Field of the Invention

This invention relates to the detection of signals in the form of short pulse groups or bursts. More particularly, it relates to the detection of such signals in the presence of substantial pulse energy from interfering sources.

2. Prior Art

The invention is particularly useful in microwave systems, where certain information may be received in the form of pulse bursts. These bursts are conventionally sensed by means of a boxcar detector connected to store the demodulated radio frequency signals. When each pulse is demodulated, a gate is opened to pass the pulse to a storage capacitor; the gate is then closed so that, during the interval between the pulse and the next incoming pulse, the capacitor remains charged to the peak voltage of the pulse. Therefore, over an interval of several or more pulses, the capacitor voltage corresponds to the envelope of the incoming pulses.

In an interference-free environment, a detector of this type will readily indicate the reception of a burst of pulses. It will not, however, provide suitable performance in the presence of strong interfering signals. Such signals saturate the receiver if no automatic gain control is provided, and if the receiver does include gain control, they reduce the sensitivity of the receiver to the point where relatively weak pulse bursts cannot be detected.

Moreover, if the interfering signal is a long pulse train interlaced with the intermittent bursts to be detected, the boxcar arrangement may miss the pulse bursts because the envelope of the total incoming energy may not vary appreciably during such bursts. Finally, since amplitude modulation of an interfering signal will cause an envelope change, the detector will provide the same output for an incoming pulse train of rapidly varying amplitude as it will for a pulse burst, thereby providing a false indication of the presence of the burst.

OBJECTS OF THE INVENTION

Accordingly, a principal object of the invention is to provide a pulse receiving and detecting system capable of detecting pulse bursts in the presence of high-level interfering signals.

Another object of the invention is to provide a system of the above type capable of distinguishing pulse bursts from interfering pulse trains of relatively long duration.

A further object is to provide a system of the above type capable of distinguishing pulse bursts from variations in the received amplitude of longer duration pulse trains.

Yet another object of the invention is to provide a system of the above type that involves relatively simple circuitry and can easily be incorporated into existing receivers.

SUMMARY OF THE INVENTION

In essence, a system incorporating the invention senses only the rate of incoming pulse. That is, it is insensitive to the energy of the individual pulses, i.e. their amplitude and duration. With strong pulses thus being treated the same as weak ones, a burst of pulses is readily detected in a background of much stronger pulses by virtue of the fact that the overall pulse rate increases when the pulse burst is received. At the same time, the system will not respond to amplitude variations in an incoming pulse train, except insofar as the pulse amplitude varies between points above and below the threshold of the system.

The invention is easily implemented. The pulses from a conventional demodulator in a receiver are applied to a counting circuit which in effect counts the number of pulses received in successive short time intervals. Its output is therefore a running indication of the repetition rate of incoming pulses. The pulse repetition rate increases and decreases with the beginning and end of an incoming pulse burst, and the corresponding signal components in the output of the counting circuit are of relatively high frequency. On the other hand, the background energy, e.g. interfering pulse signals, generally have a fairly constant repetition rate and consequently provided DC or comparatively low-frequency components in the counting circuit output. The pulse bursts can thus be readily distinguished from the background by passing the output of the averaging circuit through a high pass filter.

In its preferred form the counting circuit is an averaging circuit whose output corresponds essentially to the number of pulses received over the time constant of the circuit. Because it responds immediately to each incoming pulse, an analog circuit of this type provides a continuously updated indication of the pulse repetition rate. A pulse burst can therefore be detected almost immediately after it begins. The pulses applied to the averaging circuit are standardized, so that the effect of any pulse on the averaging circuit output is independent of the amplitude and duration of the pulse. This provides the desired insensitivity to amplitude variations in the received pulses.

The system may in many cases be operated without an automatic gain control. If a gain control is provided, it should operate on a pulse-by-pulse basis. The receiver will then not be desensitized by strong signals to the point where it is incapable of detecting relatively weak pulse bursts.

BRIEF DESCRIPTION OF THE DRAWINGS

For a fuller understanding of the nature and objects of the invention, reference should be had to the following detailed description taken in connection with the accompanying drawings, in which: which:

FIG. 1 is a schematic diagram of a receiver incorporating the invention;

FIG. 2 is a detailed schematic diagram of an averaging circuit and high pass filter which may be employed in the receiver of FIG. 1; and FIGS. 3A-3D graphically illustrate corresponding signals at different points on the receiver.

DETAILED DESCRIPTION OF THE INVENTION

As shown in FIG. 1, a receiver incorporating the invention includes an antenna 10 whose output is applied to an RF section 12 usually containing both amplifying and frequency selective components. A demodulator 14 demodulates the output of the section 12, and in a microwave receiver the demodulated or "video" signal will ordinarily consist of a series of pulses owing to the pulse nature of most microwave transmissions. Continuous wave transmissions will result in a relatively constant or DC component in the output of the demodulator 14; this component is usually small enough to be disregarded insofar as the operation of the present invention in concerned.

The pulses from the demodulator 14 are converted into standard pulses by a pulse standardizer 16. The standard pulses bear the same time relationship as the received pulses from which they are derived. However, they all have the same amplitude and pulse width regardless of the values of these parameters in the input pulses. For example, the pulse standardizer may comprise a one-shot or monostable multivibrator, which is triggered by the leading edge of each of the pulses from the demodulator 14. The amplitude of the pulses emitted by the standardizer 16 are thus determined solely by the supply voltages and the values of the various components incorporated in the multivibrator. The duration of each standardized pulse, which corresponds to the duration of the unstable state of the multivibrator, is similarly fixed.

The standardized pulses are applied to a pulse counting circuit 18, which preferably is a conventional averaging circuit as described below. The output voltage of the circuit 18 thus corresponds to the number of such pulses received within the averaging interval of the circuit. This signal, in turn, is passed through a high pass filter 20, which detects relatively rapid changes in the average pulse rate from the residual or relatively long term average. It is these rapid or short term changes that are to be detected by the system and utilized by a suitable output device 22 that receives the output of the filter 20.

FIG. 3A depicts the output of the demodulator 14 when pulse bursts 24 are received along with an interfering pulse train of greater signal strength. FIG. 3B shows the corresponding output of the pulse standardizer 16. The amplitude variations in the interfering signal have been removed and the pulses corresponding to the bursts 24 have the same amplitude as the pulses in the interfering signal. The drawing does not indicate relative pulse widths; however, it should be noted that the pulses in FIG. 3B have the same width, although those in FIG. 3A may not.

FIG. 3C represents the output of the averaging circuit 18 in response to the input shown in FIG. 3B. Since all pulses from the standardizer 16 are treated alike by the averaging circuit, the latter has a constant output, as shown at 26, during intervals when only interfering signals of constant pulse repetition rate are being received. This is so even at 26a, the portion of the output corresponding to amplitude variation in the interfering signal. On the other hand, the output of the averaging circuit increases and decreases in the lobe portions 24a corresponding to the pulse bursts 24. In particular, this voltage increases with the onset of each pulse burst, because of the net increase in pulse repetition rate in the input of the averaging circuit; and it then decreases after the end of each burst because of the decrease in net repetition rate.

FIG. 3D represents the output of the high pass filter 20. The constant components of the output of the averaging circuit 18 are not passed by this filter, thereby leaving only the lobe portions 25 corresponding to the pulse bursts 24. Variations in the pulse repetition rate of the interfering signal will ordinarily be slower than the abrupt changes in net repetition rate caused by the onset and cessation of each of the pulse bursts 24. The former variations therefore provide lower frequency components in the output of the averaging circuit 18 than do the pulse bursts, and they are thus largely eliminated by the thresholding action of high pass filter 20. Also, if desired, occasional rapid changes in the pulse rate of the interfering signals can be distinguished from a succession of pulse bursts by suitable circuits in the output device 22.

As shown in FIG. 2, a suitable averaging circuit may be a simple two-stage low-pass filter comprising series resistors 30 and 32 and shunt capacitors 34 and 36. A diode 38 prevents reverse current flow toward the pulse standardizer 16 between pulses; a shunt resistor 40 provides the discharge path for the capacitors 34 and 36. The resistor 30 may in part be the output resistance of the pulse standardizer 16.

The time constant (discharge) of the averaging circuit will ordinarily be substantially less than the duration of a pulse burst to be detected by the system.

By way of example, an averaging circuit was constructed with the following component values:

| | |
|---|---|
| Resistor 30 | 1,000 ohms |
| Resistor 32 | 33,000 ohms |
| Resistor 40 | 11,000 ohms |
| Capacitor 34 | 0.1 mfd. |
| Capacitor 36 | 0.02 mfd. |

A series of pulse bursts, each including four pulses having a repetition rate of 2 kHz., were applied to the circuit of FIG. 3 along with an interfering background consisting of a continuous pulse train having the same pulse amplitude as the bursts. The pulse repetition rate of the background was varied from 50 Hz. to 50 kHz. and the bursts were readily distinguishable from the background over this entire range.

With higher background pulse repetition rates, the averaging circuit output lobes corresponding to the pulse bursts are somewhat diminished in amplitude because of the resulting relatively high average voltage on the capacitors 34 and 36 (FIG. 2). This voltage reduces the amount of charge added to the capacitors by the pulses in a burst and thus reduces the increase in voltage resulting from the bursts. If the background pulse repetition rate is so high as to make it difficult to distinguish the pulse bursts in the output of the averaging circuit, one can use a correspondingly higher charging resistance (resistor 30), together with a higher voltage in the output of the pulse standardizer 16. This will maintain operation of the averaging circuit in a more linear portion of the charging characteristics of the capacitors 34 and 36 and thereby restore the desired amplitude of the lobe portions 24a (FIGS. 3C). The higher charging resistance may be provided by interposing between the pulse standardizer 16 and the averaging circuit 18 an amplifier connected to operate as a constant current source.

With further reference to FIG. 2, the high pass filter 20 preferably includes a differential threshold amplifier 44, one of whose input terminals is connected directly to the output terminal of the averaging circuit 18. The voltage for the other input terminal of the amplifier 44 is derived from the output of the averaging circuit by means of a low-pass filter 46. Thus, the two input signals for the amplifier 44 are (1) the entire output of the averaging circuit 18, and (2) a reference DC level against which the unfiltered signal containing high-frequency density changes is compared. The output of the amplifier 44 is an amplified and squared difference between the two inputs and therefore contains only signal corresponding to the high-frequency components in the output of the averaging circuit 18, i.e. mainly the components corresponding to pulse bursts. Amplifier 44 puts out a pulse only when a threshold is exceeded.

Accordingly, the filter 20 provides not only the desired functions of separating the lobes 24a (FIG. 3C) from the background level, as well as amplifying these lobes, it also adjusts to different background levels by canceling them out in the subtraction process. It thereby avoids saturation by high background levels. If the filtering function were accomplished by a conventional passive high pass filter, the filter might reduce the signal level to the point where it could no longer be utilized. One might attempt to overcome this problem by inserting an amplifier between the averaging circuit and the passive filter, but the amplifier would be subject to saturation by high background levels. Both of these problems are avoided by the preferred circuit, which provides direct amplification of the desired signal while avoiding saturation.

It will be apparent that one may make numerous modifications in the system without departing from the scope of the invention. For example, in some applications a digital counter might be substituted for the analog counting circuit 18. The digital counter would count the number of input pulses over a short interval corresponding, for example, to the time constant of the circuit 18; it would then reset to begin counting again. The successive pulse counts obtained by the counter would then be compared, by analog or digital methods, to ascertain the reception of pulse bursts. If a digital counter is used, the pulse standardizing function is provided by the counter itself, and the standardizer 16 is actually a part of the counting circuit 18. As another example, the high pass filter 20 might be eliminated if one were to display graphically the output of the counting circuit 18 and then visually determine the presence of pulse bursts.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of

I claim:

1. A system for detecting pulse bursts in an incoming train of pulses, said system comprising
  A. means for counting the pulses received in successive intervals, thereby to provide a repetition rate signal corresponding to the number of pulses received in each of said intervals, and
  B. means for distinguishing variations in the magnitude of said signal, thereby to distinguish said pulse bursts from background pulses.

2. The system defined in claim 1
  A. including a pulse standardizer connected to standardize the incoming pulses, and
  B. in which said counting means is an averaging circuit connected to receive said standardized pulses and provide said repetition rate signal in response thereto.

3. The system defined in claim 2 in which said averaging circuit has a time constant that is less than the duration of a pulse burst.

4. The system defined in claim 2 in which said distinguishing means is a high pass filter.

5. The system defined in claim 4 in which said high pass filter comprises
  A. a differential amplifier having a pair of input terminals and providing an output corresponding to the difference between the voltages applied to said input terminals,
  B. means connecting one of said input terminals to receive the output of said averaging circuit
  C. a low-pass filter connected to filter the output of said averaging circuit and apply the low-frequency components resulting therefrom to the other of said differential amplifier input terminals.

6. A receiver for the detection of pulse bursts of radio frequency energy, said receiver comprising
  A. a demodulator connected to demodulate the incoming radio frequency signals,
  B. means for counting the pulses from the demodulator over successive intervals, thereby to provide a repetition rate signal corresponding to the number of pulses received in each of said intervals, and
  C. means for distinguishing variations in the magnitude of said signal, thereby to distinguish said pulse bursts from background pulses.

7. The system defined in claim 6
  A. including a pulse standardizer connected to standardize the incoming pulses, and
  B. in which said counting means is an averaging circuit connected to receive said standardized pulses and provide said repetition rate signal in response thereto.

8. The system defined in claim 7 in which said averaging circuit has a time constant that is less than the duration of a pulse burst.

9. The system defined in claim 7 in which said distinguishing means is a high pass filter.

10. The system defined in claim 9 in which said high pass filter comprises
  A. a differential amplifier having a pair of input terminals and providing an output corresponding to the difference between the voltages applied to said input terminals,
  B. means connecting one of said input terminals to receive the output of said averaging circuit,
  C. a low-pass filter connected to filter the output of said averaging circuit and apply the low-frequency components resulting therefrom to the other of said differential amplifier input terminals.

PO-1050
(5/69)

UNITED STATES PATENT OFFICE
CERTIFICATE OF CORRECTION

Patent No. 3,603,988          Dated September 7, 1971

Inventor(s) George L. Johnson

It is certified that error appears in the above-identified patent and that said Letters Patent are hereby corrected as shown below:

Column 1, after line 5       Insert --This is a continuation-in-part of application Serial No. 745,951, filed July 1968, now abandoned.--

Signed and sealed this 3rd day of December 1974.

(SEAL)
Attest:

McCOY M. GIBSON JR.          C. MARSHALL DANN
Attesting Officer             Commissioner of Patents